(12) United States Patent
Karczewicz et al.

(10) Patent No.: US 9,900,617 B2
(45) Date of Patent: Feb. 20, 2018

(54) SINGLE COLOR PALETTE MODE IN VIDEO CODING

(71) Applicant: QUALCOMM Incorporated, San Diego, CA (US)

(72) Inventors: Marta Karczewicz, San Diego, CA (US); Wei Pu, San Diego, CA (US); Vadim Seregin, San Diego, CA (US); Li Zhang, San Diego, CA (US); Joel Sole Rojals, San Diego, CA (US); Feng Zou, San Diego, CA (US); Rajan Laxman Joshi, San Diego, CA (US)

( * ) Notice: Subject to any disclaimer, the term of this patent is extended or adjusted under 35 U.S.C. 154(b) by 161 days.

(21) Appl. No.: 14/743,829

(22) Filed: Jun. 18, 2015

(65) Prior Publication Data

US 2015/0373325 A1 Dec. 24, 2015

Related U.S. Application Data

(60) Provisional application No. 62/015,336, filed on Jun. 20, 2014, provisional application No. 62/015,959, filed on Jun. 23, 2014, provisional application No. 62/062,570, filed on Oct. 10, 2014.

(51) Int. Cl.
| | |
|---|---|
| *H04N 19/119* | (2014.01) |
| *H04N 19/00* | (2014.01) |
| *H04N 7/00* | (2011.01) |
| *H04N 19/593* | (2014.01) |
| *H04N 19/503* | (2014.01) |

(52) U.S. Cl.
CPC ......... *H04N 19/593* (2014.11); *H04N 19/503* (2014.11)

(58) Field of Classification Search
CPC .... H04N 19/00; H04N 19/503; H04N 19/593; H04N 7/00
See application file for complete search history.

(56) References Cited

U.S. PATENT DOCUMENTS

| | | | | |
|---|---|---|---|---|
| 2010/0046628 | A1* | 2/2010 | Bhaskaran | H04N 19/103 375/240.24 |
| 2015/0281728 | A1 | 10/2015 | Karczewicz et al. | |

OTHER PUBLICATIONS

Pu: "Non-RCE4; Refinement of the palette in RCE4 Test 2",16. JCT-VC Meeting; Jan. 9-17, 2014; San Jose; (Joint Collaborative Team on Video Coding of ISO/I EC JTC1/SC29/WG11 and ITU-TSG.16); No. JCTVC-P0231, Jan. 7, 2014, XP030115773.*

(Continued)

*Primary Examiner* — Behrooz Senfi
*Assistant Examiner* — Maryam Nasri

(57) ABSTRACT

Techniques are described for palette-based video coding. In palette-based coding, a video coder may form a "palette" as a table of colors for representing video data of a particular area (e.g., a given block). Rather than coding actual pixel values (or their residuals), the video coder may code palette index values for one or more of the pixels that correspond to entries in the palette representing the colors of the pixels. A palette may be explicitly encoded, predicted from previous palette entries, or a combination thereof. In this disclosure, techniques are described for coding a block of video data that has a single color value using a single color mode as a sub-mode of a palette coding mode. The disclosed techniques enable a block having a single color value to be coded with a reduced number of bits compared to a normal mode of the palette coding mode.

14 Claims, 6 Drawing Sheets

(56) References Cited

OTHER PUBLICATIONS

Lai : "Description of screen content coding technology proposal by MediaTek", 17. JCT-VC Meeting; Mar. 27, 2014-Apr. 4, 2014; Valencia; (Joint Collaborative Team on Video Coding of ISO/I EC JTC1/SC29/ WG11 and ITU-T SG.16 ); No. JCTVC-Q0033-V4, Mar. 26, 2014, XP030115920.*
Second Written Opinion from corresponding PCT Application Serial No. PCT/US2015/036742 dated Jun. 29, 2016 (6 pages).
International Preliminary Report on Patentability from corresponding PCT Application Serial No. PCT/US2015/036742 dated Sep. 12, 2016 (10 pages).
Pu et al., "Non-RCE4: Refinement of the Palette in RCE4 Test 2," JCT-VC Meeting Jan. 9-17, 2014; 16th Meeting San Jose (Joint Collaborative Team on Video Coding of ISO/IEC JTC1/WG11 and ITU-T SG.16); URL: http://wftp3.itu.int/av-arch/jctvc-site/,,No. JCTVC-P0231; Jan. 7, 2014; (XP030115773) (4 pages).
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/ WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/ WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/ WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of Audiovisual services—Coding of moving video, Advanced video coding for generic audiovisual services, The International Telecommunication Union. Apr. 2013, 317 pp.
ITU-T H.265 Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265 Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Single Color Intra Mode for Screen Content Coding," JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site,, No. JCTVC-Q0093-v3, Mar. 28, XP030116004, 7 pp.
Chen, et al., "SCCE3 Test D.1: Single Color Intra Mode for Screen Content Coding," JCT-VC Meeting; Jun. 30-Jul. 9, 2014; Sapporo; (Joint Collaborative Team on Video Coding of ISO/IEC JTC1/ SC29/WG11 and ITU-T SG.16 ); URL: http://wftp3.itu.int/av-arch/jctvc-site/,, No. JCTVC-R0058, Jun. 20, 2014, XP030116301, 10 pp.
Lai, et al., "Description of Screen Content Coding Technology Proposal by MediaTek," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0033-v4, Mar. 26, 2014, 31 pp.
Lai, et al., "Non-SCCE3 Test D.1 Modified Single Color Mode," JCT-VC Meeting; Jun. 30-Jul. 9, 2014; Sapporo; (Joint Collaborative Team on Video Coding of ISO/IEC JTC1/5C29/WG11 and ITU-T 5G.16 ); URL: http://wftp3.itu.int/av-arch/jctvc-site/, No. JCTVC-R.0198-v3, Jul. 6, 2014, XP030116490, 7 pp.
Pu, et al., "AHG10: Suggested Software for Palette Coding based on RExt6.0," JCT-VC Meeting; Mar. 27-Apr. 4, 2014; (Joint Collaborative Team on Video Coding of ISO/IEC JTC1/SC29/WG11 and ITU-T SG.16); No. JCTVC-Q0094; Mar. 19, 2014; 4 pp.
Flynn, et al., "High efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-T SG.16); No. JCTVC-Q1005_v4, Apr. 10, 2014; 376 pp.
Joshi, et al., "High Efficiency Video Coding (HEVC) Screen Content Coding: Draft 1," JCT-VC Meeting; Jun. 30-Jul. 9, 2014; (Joint Collaborative Team on Video Coding of ISO/IEC JTC1/SC29/ WG11 and ITU-T SG.16); No. JCTVC-R1005_v2, Aug. 23, 2014, 362 pp.
Joshi, et al., "High Efficiency Video Coding (HEVC) Screen Content Coding: Draft 1," JCT-VC Meeting; Jun. 30-Jul. 9, 2014; (Joint Collaborative Team on Video Coding of ISO/IEC JTC1/SC29/ WG11 and ITU-T SG.16); No. JCTVC-R1005_v3, Sep. 27, 2014, 362 pp.
Joshi, et al., "High Efficiency Video Coding (HEVC) Screen Content Coding: Draft 2," JCT-VC Meeting; Jun. 30-Jul. 9, 2014; (Joint Collaborative Team on Video Coding of ISO/IEC JTC1/SC29/ WG11 and ITU-T SG.16); No. JCTVC-S1005, 374 pp.
International Search Report and Written Opinion from International Application No. PCT/US2015/036742, dated Nov. 10, 2015, 12 pp.

* cited by examiner

SINGLE COLOR PALETTE MODE IN VIDEO CODING

RELATED APPLICATIONS

This application claims the benefit of U.S. Provisional Application No. 62/015,336, filed Jun. 20, 2014, U.S. Provisional Application No. 62/015,959, filed Jun. 23, 2014, and U.S. Provisional Application No. 62/062,570, filed Oct. 10, 2014, the entire contents of each of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques for palette-based video coding. In palette-based coding, a video coder (e.g., a video encoder or a video decoder) may form a "palette" as a table of colors for representing video data of a particular area (e.g., a given block). Palette-based coding may be especially useful for coding areas of video data having a relatively small number of colors. Rather than coding actual pixel values (or their residuals), the video coder may code palette index values for one or more of the pixels that correspond to entries in the palette representing the colors of the pixels. A palette may be explicitly encoded and sent to the decoder, predicted from previous palette entries, or a combination thereof. In this disclosure, techniques are described for coding a block of video data that has a single color value using a single color mode as a sub-mode of a palette coding mode. The disclosed techniques enable a block having a single color value to be coded with a reduced number of bits compared to a normal mode of the palette coding mode.

In one example, this disclosure is directed to a method of decoding video data, the method comprising receiving a syntax element indicating whether a block of video data is to be decoded using a single color mode as a sub-mode of a palette coding mode; in the case that the block is to be decoded using the single color mode of the palette coding mode, generating a palette for the block including a single palette entry that indicates a single color value; and decoding the block using the single color mode of the palette coding mode with respect to the palette such that all pixels within the decoded block have the single color value indicated in the palette for the block.

In another example, this disclosure is directed to a method of encoding video data, the method comprising determining whether all pixels within a block of video data have a single color value such that the block is to be encoded using a single color mode as a sub-mode of a palette coding mode; in the case that the block is to be encoded using the single color mode of the palette coding mode, generating a palette for the block including a single palette entry that indicates the single color value; encoding the block using the single color mode of the palette coding mode with respect to the palette; and signaling a syntax element indicating that the block is encoded using the single color mode of the palette coding mode.

In a further example, this disclosure is directed to a video decoding device comprising a memory configured to store video data, and one or more processors in communication with the memory. The one or more processors of the video decoding device are configured to receive a syntax element indicating whether a block of video data is to be decoded using a single color mode as a sub-mode of a palette coding mode; in the case that the block is to be decoded using the single color mode of the palette coding mode, generate a palette for the block including a single palette entry that indicates a single color value; and decode the block using the single color mode of the palette coding mode with respect to the palette such that all pixels within the decoded block have the single color value indicated in the palette for the block.

In an additional example, this disclosure is directed to a video encoding device comprising a memory configured to store video data, and one or more processors in communication with the memory. The one or more processors of the video encoding device are configured to determine whether all pixels within a block of video data have a single color value such that the block is to be encoded using a single color mode as a sub-mode of a palette coding mode; in the case that the block is to be encoded using the single color mode of the palette coding mode, generate a palette for the block including a single palette entry that indicates the single color value; encode the block using the single color mode of the palette coding mode with respect to the palette; and signal a syntax element indicating that the block is encoded using the single color mode of the palette coding mode.

The details of one or more examples of the disclosure are set forth in the accompanying drawings and the description below. Other features, objects, and advantages will be apparent from the description, drawings, and claims.

DETAILED DESCRIPTION

Figure 1:
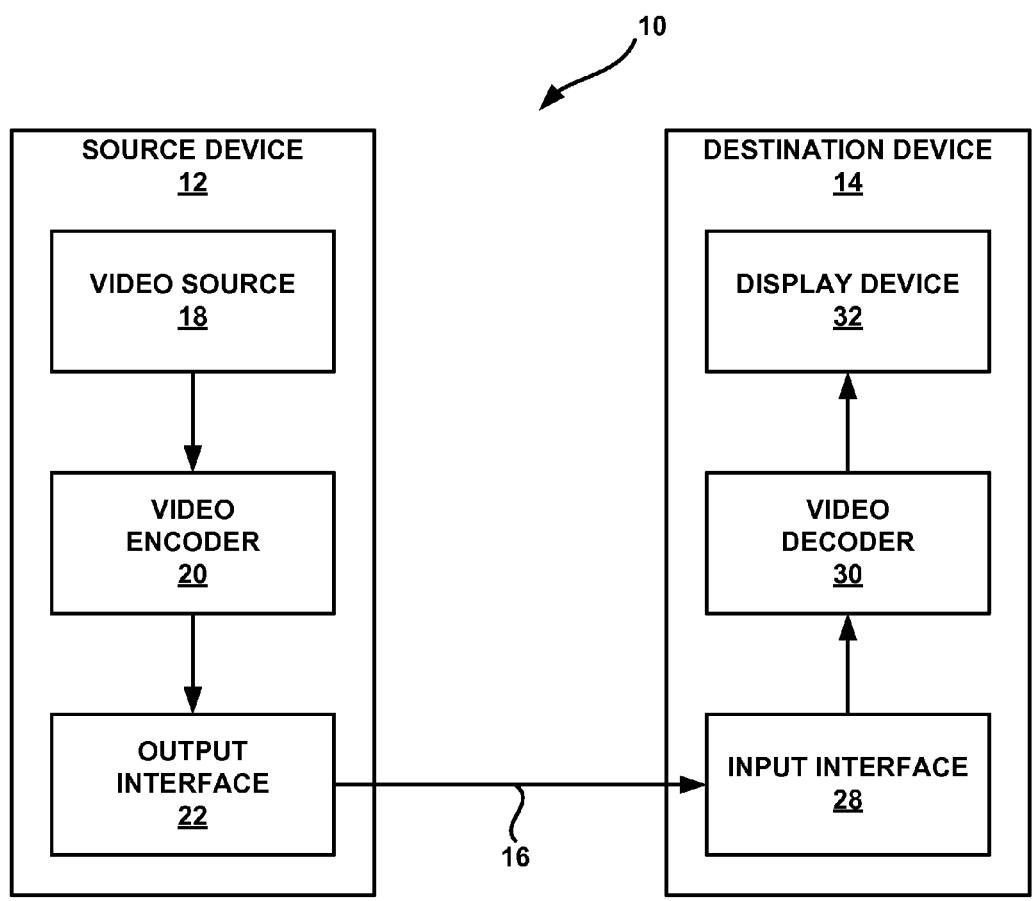
FIG. 1 is a block diagram illustrating an example video coding system that may utilize the techniques described in this disclosure.

This disclosure includes techniques for video coding and compression. In particular, this disclosure describes techniques to support coding of video content, especially screen content, with palette-based coding. This disclosure describes multiple technical aspects of palette-based coding, including techniques for coding a block of video data that has a single color value using a single color mode as a sub-mode of a palette coding mode.

According to the techniques described in this disclosure, in the case that the block has the single color value, a video encoder generates a palette for the block including a single palette entry that indicates the single color value, encodes the block using the single color mode with respect to the palette, and signals a syntax element indicating that the block is encoded using the single color mode in an encoded bistream. In some examples, the video encoder may also signal the single color value in the encoded bitstream either as a non-predicted palette entry or as a predicted entry from a palette predictor.

In further accordance with the disclosed techniques, upon receiving the syntax element in an encoded bitstream indicating that the block is to be decoded using the single color mode, the video decoder generates a palette including a single palette entry that indicates a single color value, and decodes the block with respect to the palette such that all pixels within the block have the single color value indicated in the palette. In some examples, the video decoder may generate the palette for the block based on receiving the single color value in the encoded bitstream as a non-predicted palette entry, and using the non-predicted palette entry as the single palette entry in the palette. In other examples, the video decoder may generate the palette for the block based on selecting an entry in a palette predictor that indicates the single color value to be the single palette entry in the palette.

In this way, a block having a single color value may be coded using the single color mode of the palette coding mode with a reduced number of bits compared to a normal mode of the palette coding mode. For example, a video coder (e.g., a video encoder or a video decoder) may code a current block using the single color mode of the palette coding mode without having to code a binary palette prediction vector used to generate a palette, a number of non-predicted palette entries and their corresponding values included in the palette, a flag to indicate whether escape pixels having colors that are not included in the palette are present in the block, or any index values corresponding to palette entries that indicate color values for pixels within the block.

In traditional video coding, images are assumed to be continuous-tone and spatially smooth. Based on these assumptions, various tools have been developed such as block-based transform, filtering, etc., and such tools have shown good performance for natural content videos. In applications like remote desktop, collaborative work and wireless display, however, computer generated screen content may be the dominant content to be compressed. This type of content tends to have discrete-tone and feature sharp lines, and high contrast object boundaries. The assumptions of continuous-tone and smoothness may no longer apply, and thus, traditional video coding techniques may be inefficient ways to compress the content.

This disclosure describes palette-based coding, which is not limited to but may be particularly suitable for screen content coding. For example, assuming a particular area of video data has a relatively small number of colors, a video coder (e.g., a video encoder or video decoder) may code a so-called "palette" to represent the video data of the particular area. The palette may be expressed as a table of colors representing the video data of the particular area (e.g., a given block). For example, the palette may include the most dominant colors (i.e., pixel values) in the given block. In some cases, the most dominant colors may include the one or more colors that occur most frequently within the block. Additionally, in some cases, a video coder may apply a threshold value to determine whether a color is to be included as one of the most dominant colors in the block. According to various aspects of palette-based coding, the video coder may code index values indicative of one or more of the pixels of the current block, instead of coding the actual pixel values or their residuals for the current block. In the context of palette-based coding, the index values indicate respective entries in the palette that are used to represent the colors of the individual pixels of the current block.

For example, the video encoder may encode a block of video data by determining a palette for the block, locating entries in the palette that represent colors of one or more pixels of the block, and encoding the block with index values that indicate the entries in the palette. For those pixels of the block with color values that map to entries in the palette, the video encoder may encode the index values of the entries for the respective pixels. For those pixels of the block with color values that do not map to entries in the palette, the video encoder may encode a special index for the pixel and encode the actual pixel value or its residual value (or a quantized version thereof). These pixels may be referred to as "escape pixels." In some examples, a palette may include zero entries representing no color values. In this example, all pixels of the block have color values that do not map to entries in the palette and, thus, are encoded as escape pixels.

In some examples, the video encoder may signal the palette, the index values, and any escape pixels, in an encoded bitstream. In turn, the video decoder may obtain, from an encoded bitstream, the palette for the block, one or more index values for one or more of the pixels of the block, and pixel values for any escape pixels of the block. The video decoder may map the index values to entries of the palette and decode the escape pixels to reconstruct the pixel values of the block. The example above is intended to provide a general description of palette-based coding.

The techniques for palette-based coding of video data may be used with one or more other coding techniques, such as techniques for inter- or intra-predictive coding. For example, as described in greater detail below, a video encoder or video decoder or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a video coding standard developed by the Joint Collaboration Team on Video Coding (JCT-VC) of ITU-T Video Coding Experts Group (VCEG) and ISO/IEC Motion Picture Experts Group (MPEG). The finalized HEVC standard, hereinafter referred to as "HEVC Version 1," is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013, with another version published in October 2014.

The Range Extensions to HEVC, namely HEVC-Rext, is being developed by the JCT-VC. A recent Working Draft (WD) of Range Extensions, hereinafter referred to as "RExt WD7." is available from http://phenix.int-evry.fr/jct/doc_end_user/documents/17_Valencia/wg11/JCTVC-Q1005-v4.zip. The JCT-VC is also developing HEVC Screen Content Coding (SCC), which is based on the HEVC-Rext. A recent WD of the HEVC SCC extension, hereinafter referred to as SCC WD1.0, is available from http://phenix.int-evry.fr/jct/doc_end_user/documents/18_Sapporo/wg11/JCTVC-R1005-v3.zip. A more recent WD of the HEVC SCC extension, hereinafter referred to SCC WD2.0, is available from http://phenix.int-evry.fr/jct/doc_end_user/documents/19_Strasbourg/wg11/JCTVC-S1005-v1.zip.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

The basic idea of palette-based coding is that, for each CU, a palette is derived that includes the most dominant one or more colors (i.e., pixel values) in the current CU. In some cases, a palette may be derived that includes no colors. The palette size and the palette entries of the palette may be transmitted from a video encoder to a video decoder. The palette size and entries of the palette may be directly coded or predictively coded using the size and entries, respectively, of palettes for one or more neighboring CUs (e.g. above and/or left coded CUs).

Once the video coder generates the palette for the current CU, the pixels of the current CU may be coded based on the palette according to a certain scanning order. For each pixel location in the CU, a flag may be transmitted to indicate whether the color of the pixel is included in the palette. For those pixels that map to an entry in the palette, a palette index associated with that entry may be signaled for the given pixel location in the CU. In some cases, run mode coding may be used such that the palette index associated with the pixel location in the CU is signaled followed by a "run" of the pixel value. In this case, neither the flag nor the palette index needs to be transmitted for the following pixel locations that are covered by the "run" as they all have the same pixel value. For those pixels with color values that do not map to entries in the palette (i.e., escape pixels), a special index may be assigned to the pixel and the actual pixel value or its residual value (or a quantized version thereof) may be transmitted for the given pixel location in the CU. The escape pixels may be coded using any existing entropy coding method such as fixed length coding, unary coding, etc.

This disclosure describes techniques for coding a block of video data using a palette coding mode and, more specifically, coding a block of video data that has a single color value using a single color mode as a sub-mode of the palette coding mode. In the palette coding mode, a palette includes one or more entries that are numbered by an index and represent color values or intensities for one or more color components (for example, RGB, YUV, etc.) that may be used as predictors for a block or as final reconstructed pixels or samples of the block. In some examples, each palette entry in a given palette specifies color values for all color components of a pixel or sample, e.g., a single palette for YUV. In other examples, each palette entry in a given palette specifies a color value for a given color component of a pixel or sample, e.g., a separate palette for Y, a separate palette for U, and a separate palette for V.

The palette may make up a relatively significant portion of the bits signaled for a current CU coded using the palette coding mode. Accordingly, a video coder may predict one or more entries of the palette for coding the current CU based on one or more entries of a palette predictor, which may also be referred to as a palette predictor table or palette predictor list. As described in Wei Pu, et al., "AHG10: Suggested Software for Palette Coding based on REext6.0," JCTVC-Q0094, Joint Collaborative Team on Video Coding (JCT- VC) of ITU-T SG16 WP3 and ISO/IEC JTC1/SC29/WG11, 17th Meeting: Valencia, ES, 27 Mar.-4 Apr. 2014, a palette may include one or more entries that are copied from a palette predictor. A palette predictor may include one or more palette entries from one or more palettes of previously coded neighboring blocks or other reconstructed samples.

The video coder may use a binary palette prediction vector to indicate whether each of the entries in the palette predictor is used (or not used) for predicting one or more entries in the palette for the current CU being coded. For example, when a palette predictor is used (e.g., as described in greater detail with respect to the example of FIG. 4), for each entry in the palette predictor, the video coder may signal (e.g., coded by a video encoder in an encoded bitstream to be decoded by a video decoder) a binary flag that indicates whether the respective entry from the predictor palette is to be copied to the palette for the current CU (e.g., indicated by flag=1). The set of binary flags for all entries in the palette predictor may be referred to as the binary palette prediction vector. Additionally, the palette for the current CU may include new entries, e.g., in addition to the predicted entries copied from the palette predictor. The video coder may explicitly signal color values of the new entries in the palette, and the video coder may also signal a number of the new entries included in the palette for the current CU.

In some examples, all of the entries in the palette predictor may be derived from a single palette for a previously coded CU. In cases where the previously coded CU is spatially far away from the current CU, however, the palette correlation between the previously coded CU and the current CU may be relatively weak. In general, expanding the palette predictor to include more entries from two or more palettes for multiple previously coded CUs may be helpful by providing more accurate predictors for palette entries of the current CU, which may result in an efficiency gain. However, determining and using a relatively large palette predictor results in a relatively long binary palette predictor vector.

In U.S. application Ser. No. 14/667,411, filed Mar. 24, 2015, which claims the benefit of U.S. Provisional Patent Application No. 61/970,257, filed Mar. 25, 2014, binary tree based signaling methods and end-position based signaling methods are described for coding the binary palette prediction vector. In U.S. Provisional Application No. 62/002,741, filed May 23, 2014, a group based signaling method is described for coding the binary palette prediction vector. Also in U.S. application Ser. No. 14/667,411, filed Mar. 24, 2015, which claims the benefit of U.S. Provisional Patent Application No. 62/015,327, filed Jun. 20, 2014, a run-length based signaling method was described for coding the binary palette prediction vector.

In this disclosure, items that are signaled or sent or otherwise provided generally will refer to items that may be coded (i.e., encoded) by a video encoder in an encoded bitstream. The encoded bitstream may be coded (i.e., decoded) by a video decoder, and items that are signaled in the bitstream may be used in a video decoding process. The term coding may generally refer to video encoding or video decoding. Likewise, a video coder may refer to a video encoder or a video decoder. Some aspects of coding may include signaling and encoding at the encoder side. Other aspects of coding may include receiving and decoding at the decoder side.

This disclosure describes techniques for coding a video block that has a single color value using a single color mode as a sub-mode of the palette coding mode with respect to a palette that includes only one palette entry. In this case, the signaling overhead, i.e., the number of bits used, for coding the palette may be effectively reduced compared to a normal mode of the palette coding mode.

Another tool, also referred to a single color mode, that uses one of the neighboring pixels of a current block as a candidate to predict the entire current block was described in PoLin Lai, et al., "Description of screen content coding technology proposals by MediaTek," JCTVC-Q0033, Joint Collaborative Team on Video Coding (JCT-VC) of ITU-T SG 16 WP3 and ISO/IEC JTC1/SC29/WG11, 17th Meeting: Valencia, ES, 27 Mar.-4 Apr. 2014, and in Yi-Wen Chen, et al., "Single color intra mode for screen content coding," JCTVC-Q0093, Joint Collaborative Team on Video Coding (JCT-VC) of ITU-T SG16 WP3 and ISO/IEC JTC1/SC29/WG11, 17th Meeting: Valencia, ES, 27 Mar.-4 Apr. 2014. One difference between the techniques described in this disclosure for the single color mode as a sub-mode of the palette coding mode and the single color mode tool described in JCTVC-0033 and JCTVC-Q0093 is that, in this disclosure, the candidates used to predict a current block are selected from a palette predictor rather the neighboring pixels of the current block.

Several issues with conventional palette coding mode designs are described below. In one example palette coding mode design, if an entire block to be coded has only one color (i.e., all pixels in the block have the same color value), the following bits may still need to be coded into the encoded bitstream. First, a binary palette prediction vector used to generate a palette for the block is coded in the encoded bitstream. The number of bits used to code the binary palette prediction vector may vary depending on a palette predictor size, a palette predictor distribution, and a compression algorithm. Five or more bits may typically be used to code the binary palette prediction vector. Second, a number of non-predicted palette entries and their corresponding values that are included in the palette for the block are coded in the encoded bitstream. Third, a flag to indicate whether escape pixels having color values that are included in the palette are present in the block is coded in the encoded bitstream. Fourth, a first index value corresponding to a palette entry that indicates the color value for the pixels within the block and a corresponding run-length (i.e., block size−1) is coded in the encoded bitstream.

In screen content coding, a single color block may occur frequently. In one example, the above described bits used in a conventional palette coding mode design may be reduced for a single color block by using the neighboring pixel single color mode tool described in JCTVC-0033 and JCTVC-Q0093, cited above. The neighboring pixel single color mode tool may be a CU coding mode that competes with a conventional palette coding mode. In the neighboring pixel single color mode tool, a candidate color list used to predict the single color block may include color values of one or more previously coded neighboring pixels of the single color block and/or color values from previously coded pictures or slices. In addition to the entries in the candidate color list, several constant candidates may also be used to predict the single color block. For example, if no derived candidate is available in the candidate color list and the bitdepth of the single color block is N, the YUV color value $(2^{N-1}, 2^{N-1}, 2^{N-1})$ may be used as a candidate to predict the single color block.

As another example, the candidate color list including the color values of one or more previously coded neighboring pixels and/or the color values from previous pictures or slices may be pruned to remove any duplicate color values from the candidate color list and to order the color values in the candidate color list according to certain rules. In some cases, a maximum number of previously coded neighboring pixel candidates included in the candidate color list may be restricted.

In some examples, single color information may be signaled in one or more of: a slice header, a picture parameter set (PPS), or a sequence parameter set (SPS) in an encoded bitstream. In one example, an original image of a single color block may be used to derive the most frequently used color for the single color block, and the most frequently used color may then be signaled in the slice header. In a conventional palette mode coding design, a palette mode flag (e.g., palette_mode_flag) is signaled after signaling a skip mode flag (e.g., cu_skip_flag) indicating that the block is not encoded using a skip mode, after signaling an intra block copying mode flag (e.g., intra_bc_flag) indicated that the single color block is not encoded using the intra block copying mode, and after signaling a prediction mode flag (e.g., pred_mode_flag) indicating that the single color block is encoded using an intra-prediction mode (e.g., indicated by MODE_INTRA), as indicated by the example CU syntax in Table 1 below.

TABLE 1

```
coding_unit( x0, y0, log2CbSize )
  ...
  if( slice_type != 1 )
    cu_skip_flag[ x0 ][ y0 ]
  nCbS = ( 1 << log2CbSize )
  if( cu_skip_flag[ x0 ][ y0 ] )
    prediction_unit( x0, y0, nCbS, nCbS )
  else {
    if( intra_block_copy_enabled_flag )
      intra_bc_flag[ x0 ][ y0 ]                                          ae(v)
    if( slice_type != I && !intra_bc_flag[ x0][ y0 ] )
      pred_mode_flag                                                     ae(v)
    if( palette_enabled_flag && CuPredMode[ x0 ][ y0 ] ==
        MODE_INTRA )
      palette_mode_flag[ x0 ][ y0 ]                                      ae(v)
    if( palette_mode_flag[ x0 ][ y0 ] )
      palette_coding( x0, y0, nCbS, nCbS )
    else {
  ...
```

Details of the techniques of this disclosure are described in more detail below. In general, this disclosure describes techniques for coding a block of video data that has a single color value using a single color mode as a sub-mode of a palette coding mode.

Unlike the neighboring pixel single color mode tool described above that competes with a conventional palette coding mode, the disclosed single color mode may comprise a sub-mode of the palette coding mode. According to the disclosed techniques, the single color mode of the palette coding mode may be used to code the block having the single color value with respect to a palette including a single palette entry that indicates the single color value. In addition, the single color mode of the palette coding mode may be used to code the block having the single color value using a reduced number of bits compared to the above described bits used in a conventional palette coding mode design.

In a some examples of the disclosed techniques, the single color mode may be a sub-mode of the palette coding mode. In this case, a syntax element or a flag (e.g., single_color_palette_flag) associated with a palette mode block may be used to indicate whether or not the current block is coded in the single color mode or the palette coding mode. The single color palette flag may be bypass coded or context coded using a single color palette flag for a neighbor block as context.

For example, in the case that all pixels within the current block have a single color value, a video encoder may signal the single color palette flag in an encoded bitstream, and a video decoder may receive the single color palette flag in the encoded bitstream, indicating that the current block of the video data is coded using the single color mode of the palette coding mode. In the case that all of the pixels within the current block do not have the single color value, the video encoder may signal another syntax element or flag (e.g., normal_palette_flag) in the encoded bitstream, and the video decoder may receive the normal palette flag in the encoded bitstream, indicating whether or not the current block is coded using a normal mode of the palette coding mode. In this example, both the single color mode and the normal mode may be sub-modes of the palette coding mode.

As other examples, the video encoder may signal a first syntax element in the encoded bitstream, and the video decoder may receive the first syntax element in the encoded bitstream, indicating whether or not the current block of the video data is encoded using the palette coding mode. In the case that the current block is encoded using the palette coding mode, the video encoder signal a second syntax element in the encoded bitstream, and the video decoder may receive the second syntax element in the encoded bitstream, indicating whether or not the current block is encoded using the single color mode of the palette coding mode.

In another example of the disclosed techniques, in the case that a current block is coded using the single color mode of the palette coding mode, each of the video encoder and the video decoder generates a palette for the current block including a single palette entry that indicates a single color value for the current block, and respectively encodes and decodes the current block with respect to the palette. Several different examples of generating the palette including the single palette entry and coding the block with respect to the palette are described below.

In one case, a video encoder may directly signal the single color value for the current block into the encoded bitstream as a non-predicted palette entry. A video decoder may receive the single color value as a non-predicted palette entry, and use the non-predicted palette entry as the single palette entry in the palette for the current block.

In another case, the single color value for the current block may be predicted from a palette predictor. As described above, the palette predictor includes one or more palette entries from one or more palettes of previously coded blocks that may be used to predict the single palette entry in the palette for the current block. For example, the video encoder may signal an index value in the encoded bitstream corresponding to a selected entry in a palette predictor used to predict the single palette entry in the palette that indicates the single color value. The video decoder may then receive the index value in the encoded bitstream corresponding to the entry in the palette predictor that indicates the single color value, and select the corresponding entry from the palette predictor to be the single palette entry in the palette for the block.

As one example, the palette predictor may operate as a buffer at the video decoder that includes multiple entries, e.g., five entries with corresponding index values 1-5, indicating different color values. If the single color value for the current block is predicted from a second entry of the palette predictor, an index value equal to 2 may be signaled in the encoded bitstream, and the video decoder then uses the second entry in the buffer as the single palette entry in the palette that indicates the single color value for the current block.

In this case, the binary palette prediction vector may not need to be signaled in the encoded bitstream to indicate whether or not each entry in the palette predictor is copied to the palette for the current block. Instead, in the single color mode of the palette coding mode, the techniques of this disclosure enable the position (i.e., the index value) of only the single color value in the palette predictor to be signaled in the encoded bitstream to indicate the entry from the palette predictor to be used as the single palette entry in the palette for the current block. The position or index value of the single color value in the palette predictor may be coded using an Exponential-Golomb code, a Truncated-Rice code, or a Truncated Unary code. In one example, the position or index value of the single color value in the palette predictor may be coded using a $0^{th}$ order Exponential-Golomb code.

In a further case, the single color value for the current block may be predicted from a palette predictor, but a restriction may be applied for a maximum size (i.e., a maximum number of entries or candidates) of the palette predictor. The maximum size of the palette predictor, e.g., an integer value M, may be predefined or it may be signaled in a SPS, PPS, or slice header in an encoded bitstream. For example, assuming a maximum size of the palette predictor is restricted to M, only the first entries up to M entries in the palette predictor may be used as candidates for the single color value of the current block coded in the single color mode of the palette coding mode.

As one example, both the video encoder and the video decoder may set a maximum size of the palette predictor to be equal to one (e.g., M=1) such that the palette predictor only includes a first entry. The video decoder then uses the first and only entry from the palette predictor as the single palette entry in the palette that indicates the single color value for the current block. In this example, since the palette predictor only has the first entry, the video encoder does not need to signal an index value corresponding to the first entry in the palette predictor in the encoded bitstream, and the video decoder does not need to receive an index value corresponding to the first entry in the palette predictor from the encoded bitstream.

As discussed above, if the single color palette flag indicates that the current block is coded using the single color mode of the palette coding mode (e.g., single_color_palette_flag[x0][y0]==1), all of the pixels within the current block share the same single color value. In the example where M=1 such that the palette predictor only includes one entry, the single color value may be predicted from the one entry of the palette predictor (e.g., previousPalettcEntries [cIdx][0] for color component cIdx).

For example, in the case that M=1, the signaling of the single color mode of the palette coding mode may be specified as in Table 2 below, in which additions to SCC WD1.0, cited above, are indicated by italicized text. As shown in Table 2, in the case that M=1 and the single_color_palette_flag[x0][y0]==1, the single color value for the current block is predicted from the one entry in the palette predictor and no additional syntax elements need to be signaled in the encoded bitstream. In the case that M=1 and the single_color_palette_flag[x0][y0]==0 indicating that the current block is not coded using the single color mode of the palette coding mode, then additional syntax elements (e.g., palette_transpose_flag and palette_share_flag) for a conventional palette coding mode design may be signaled in the encoded bitstream.

TABLE 2

| palette_coding( x0, y0, nCbS ) { | Descriptor |
|---|---|
| *single_color_palette_flag[x0][y0]* | *ae(v)* |
| *if(single_color_palette_flag[x0][y0] == 0) {* | |
| palette_transpose_flag | ae(v) |
| palette_share_flag[ x0 ][ y0 ] | ae(v) |
| ... | |
| *}* | |
| } | |

In an alternative example, in the case that M=1, the signaling of the single color mode of the palette coding mode may be specified as in Table 3 below, in which additions to SCC WD1.0, cited above, are indicated by italicized text and deletions are indicted by the term REMOVED followed by the deleted text in single brackets. As shown in Table 3, in the case that M=1 and the single_color_palette_flag[x0][y0]==1, the single color value for the current block is predicted from the one entry in the palette predictor and no additional syntax elements need to be signaled in the encoded bitstream. In the case that M=1 and the single_color_palette_flag[x0][y0]==0 indicating that the current block is not coded using the single color mode of the palette coding mode, then the additional syntax elements for a conventional palette coding mode design may be signaled in the encoded bitstream. In Table 3, the order of the additional syntax elements has been modified such that the palette_share_flag is signaled prior to the palette_transpose_flag.

TABLE 3

| palette_coding( x0, y0, nCbS ) { | Descriptor |
|---|---|
| *single_color_palette_flag[x0][y0]* | *ae(v)* |
| *if(single_color_palette_flag[x0][y0] == 0) {* | |
| [REMOVED: palette_transpose_flag] | [REMOVED: ae(v)] |
| palette_share_flag[ x0 ][ y0 ] | ae(v) |
| *palette_transpose_flag* | *ae(v)* |
| ... | |
| *}* | |
| } | |

As another example, both the video encoder and the video decoder may set a maximum size of the palette predictor to be equal to M wherein M is an integer value that is greater than 1 (i.e., M>1) such that the palette predictor includes a first M entries. In this example, since the palette predictor includes two or more entries, the video encoder may signal an index value corresponding to one of the first M entries in the palette predictor that is used to predict the single palette entry in the palette that indicates the single color value. The video decoder receives the index value corresponding to the one of the first M entries in the palette predictor, and uses the corresponding one of the first M entries from the palette predictor as the single palette entry in the palette that indicates the single color value for the current block. In this example, the reduced size of the palette predictor, compared to the normal mode of the palette coding mode, may reduce a number of bits needed to signal the index value corresponding to the one of the first M entries in the palette predictor in the encoded bitstream.

In an additional case, in the single color mode of the palette coding mode in which the single color value for the current block is predicted from a palette predictor, both a video encoder and a video decoder may determine to not move the predicted single palette entry for the current block to a first position of the palette predictor for use predicting palette entries for subsequently coded neighboring blocks. This is unlike the normal mode of the palette coding mode in which the predicted palette entries for a current block may be moved to a beginning of the palette predictor because the predicted palette entries have a high probability of being used to predict palette entries in a palette for a subsequent coded neighboring block. In the single color mode of the palette coding mode, this rule may not be applied. In this way, according to the techniques of this disclosure, implementation of the single coding mode of the palette coding mode is as simple as possible.

In still other examples of the disclosed techniques, the single color value for the current block may be predicted from a palette predictor, but pruning may be applied to the palette predictor in order to reduce a number of candidates for the single color value of the current block coded in the single color mode of the palette coding mode. For example, both a video encoder and a video decoder may prune or remove at least one entry from the palette predictor based on a difference between the at least one entry and a value of neighboring pixels of the current block being greater than a threshold.

In one case, the value of the neighboring pixels of the current block may be a mean value of color values in one or more of an above-neighboring line of reconstructed pixels or a left-neighboring line of reconstructed pixels. The above-neighboring line of reconstructed pixels may include all pixels in an adjacent row included in an above-neighboring block of the current block. The left-neighboring line of reconstructed pixels may include all pixels in an adjacent column included in a left-neighboring block of the current block. If the difference between the mean value of the neighboring pixels and a given palette entry in the palette predictor is greater than a threshold, the given palette entry is not treated as a candidate for the single color mode of the palette coding mode and the video encoder and the video decoder may prune or remove the given entry from the palette predictor.

In another case, rather than using a mean value of the neighboring pixels, as described above, the value of the neighboring pixels of the current block may be a median value of color values in one or more of the above-neighboring line of reconstructed pixels or the left-neighboring line of reconstructed pixels. If the difference between the median value of the neighboring pixels and a given palette entry in the palette predictor is greater than a threshold, the given palette entry is not treated as a candidate for the single color mode of the palette coding mode and the video encoder and the video decoder may prune or remove the given entry from the palette predictor.

In still another case, rather than using one of the mean value or the median value of the neighboring pixels, as described above, the value of the neighboring pixels of the current block may be a color value of one pixel in either the above-neighboring line of reconstructed pixels or the left-neighboring line of reconstructed pixels. In one example, the one pixel of the neighboring pixel used for the comparison may be the pixel at position (−1, −1) relative to the current block having a top-left corner at position (0, 0). In another example, the one pixel of the neighboring pixel used for the comparison may be the left-neighboring pixel at position (−1, 0) adjacent to the top-left corner of the current block at position (0, 0). In a further example, the one pixel of the neighboring pixel used for the comparison may be the top-neighboring pixel at position (0, −1) adjacent to the top-left corner of the current block at position (0, 0).

The video encoder and the video decoder may perform the above described pruning for each of the entries in the palette predictor such that the palette predictor includes one or more remaining entries. The video encoder may then signal an index value corresponding to one of the remaining entries in the palette predictor that is used to predict the single palette entry in the palette that indicates the single color value. The video decoder receives the index value corresponding to the one of the remaining entries in the palette predictor, and uses the corresponding one of the remaining entries from the palette predictor as the single palette entry in the palette that indicates the single color value for the current block. In this example, the reduced size of the palette predictor, compared to the normal mode of the palette coding mode, may reduce a number of bits needed to signal the index value corresponding to the one of the remaining entries in the palette predictor in the encoded bitstream.

In yet another example of the disclosed techniques, a video encoder may signal a syntax element (e.g., single_color_palette_flag) indicating whether the current block is to be coded using the single color mode of the palette coding mode after signaling a skip flag (e.g., cu_skip_flag) indicating that the current block is not coded using a skip mode, and prior to signaling a prediction mode flag (e.g., pred_mode_flag), where the prediction mode flag indicates whether the current block is coded using an inter-prediction mode or an intra-prediction mode in the case that the block is not encoded using the palette coding mode. In other cases, similar to a conventional palette coding mode described with respect to Table 1 above, the video encoder may signal the single color palette flag after signaling the prediction mode flag indicating that the current block is coded using an intra-prediction mode. For example, as indicated by the italicized text in Table 4 below, the video encoder may signal the single color palette flag (e.g., single_color_palette_flag) in the encoded bitstream if the current block is not coded using the skip mode (e.g., !cu_skip_mode).

As further indicated in Table 4 below, in the case that all pixels within the current block have a single color value, the video encoder may signal the single color palette flag (e.g., single_color_palette_flag) in the encoded bitstream, and the video decoder may receive the single color palette flag in the encoded bitstream indicating that the current block of the video data is coded using the single color mode of the palette coding mode. In the case that all of the pixels within the current block do not have the single color value and the current block is not coded using the single color mode of the palette coding mode (e.g., !single_color_palette_flag), the video encoder may signal another flag (e.g., normal_palette_flag) in the encoded bitstream, and the video decoder may receive the normal palette flag in the encoded bitstream indicating whether or not the current block is coded using the normal mode of the palette coding mode. In this example, both the single color mode and the normal mode may be sub-modes of the palette coding mode.

In the case that the current block is coded using the normal mode of the palette coding mode, the video decoder may decode the current block using the normal mode of the palette coding mode with respect to a palette that may include more than one palette entry. In some examples, the normal palette flag may be defined to be substantially similar to a palette mode flag used in a conventional palette mode coding design.

TABLE 4

```
coding_unit( x0, y0, log2CbSize )
...
    if( slice_type != I )
        cu_skip_flag[ x0 ][ y0 ]                           ae(v)
    if (!cu_skip_flag[ x0 ][ y0 ]) {
        single_color_palette_flag[x0][y0]                  ae(v)
        if(!single_color_palette_flag[x0][y0]) {
            normal_palette_flag[x0][y0]                    ae(v)
            if(normal_palette_flag[x0][y0])
                palette_coding(x0, y0, nCbS, nCbS)
    }
    if( cu_skip_flag[ x0 ][ y0 ] )
...
```

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Various non-palette based coding modes are described below, in addition to palette-based codes described in accordance with this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, wireless communication devices, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as the HEVC standard mentioned above, and described in HEVC Version 1. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 and or video decoder 30 may copy index values from the specified neighboring line and from the specified number of entries for the line of the map currently being coded.

According to aspects of this disclosure, video encoder 20 and video decoder 30 may perform any combination of the techniques for palette coding described in this disclosure, including techniques for coding a block of video data that has a single color value using a single color mode as a sub-mode of a palette coding mode. The disclosed techniques enable a block having a single color value to be coded with a reduced number of bits compared to a normal mode of the palette coding mode. In particular, in some examples, video encoder 20 and video decoder 30 may be configured to perform techniques of this disclosure that are described in more detail with respect to FIGS. 5-6.

Figure 2:
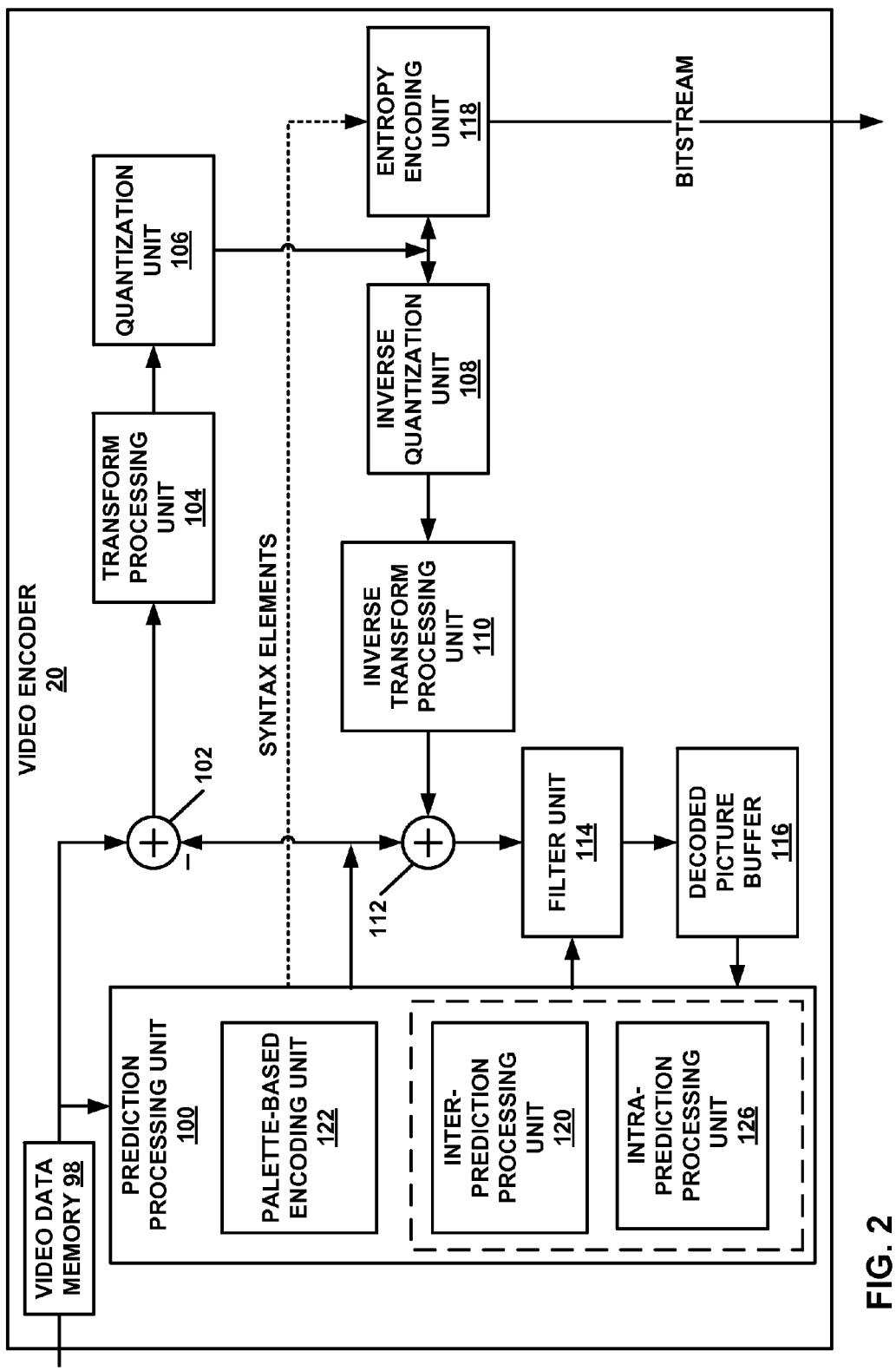
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video encoder 20, in one example, may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 2, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Video encoder 20 may initially store the video data in a video data memory (not shown). Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. Palette-based encoding unit 122 may perform palette-based coding and generate syntax elements to signal palette-based coding modes and/or palette predictors. In other examples, video encoder 20 may include more, fewer, or different functional components.

Video data memory 98 may store video data to be encoded by the components of video encoder 20. The video data stored in video data memory 98 may be obtained, for example, from video source 18. Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction unit 120 may perform different operations for a PU of a CU depending on whether the PU is in an I slice, a P slice, or a B slice. In an I slice, all PUs are intra predicted. Hence, if the PU is in an I slice, inter-prediction unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. Although various functions are described as being performed by palette-based encoding unit 122, some or all of such functions may be performed by other processing units, or a combination of different processing units.

In accordance with the techniques of this disclosure, video encoder 20 may be configured to encode a block of video data that has a single color value using a single color mode as a sub-mode of a palette coding mode. According to the techniques described in this disclosure, in the case that all pixels within a block have a single color value such that the block is to be encoded using the single color mode of the palette coding mode, palette-based encoding unit 122 of video encoder 20 generates a palette for the block including a single palette entry that indicates the single color value. Palette-based encoding unit 122 then encodes the block using the single color mode with respect to the palette, and signals a syntax element indicating that the block is encoded using the single color mode in an encoded bitstream. In some examples, palette-based encoding unit 122 may also signal the single color value in the encoded bitstream either as a non-predicted palette entry or as a predicted entry from a palette predictor.

In this way, a block having a single color value may be encoded using the single color mode of the palette coding mode with a reduced number of bits compared to a normal mode of the palette coding mode. For example, video encoder 20 may encode a current block using the single color mode of the palette coding mode without having to encode a binary palette prediction vector used to generate a palette, a number of non-predicted palette entries and their corresponding values included in the palette, a flag to indicate whether escape pixels having colors that are not included in the palette are present in the block, or any index values corresponding to palette entries that indicate color values for pixels within the block. The techniques for encoding a block of video data that has a single color value using a single color mode as a sub-mode of a palette coding mode are described in more detail with respect to FIG. 5.

Figure 3:
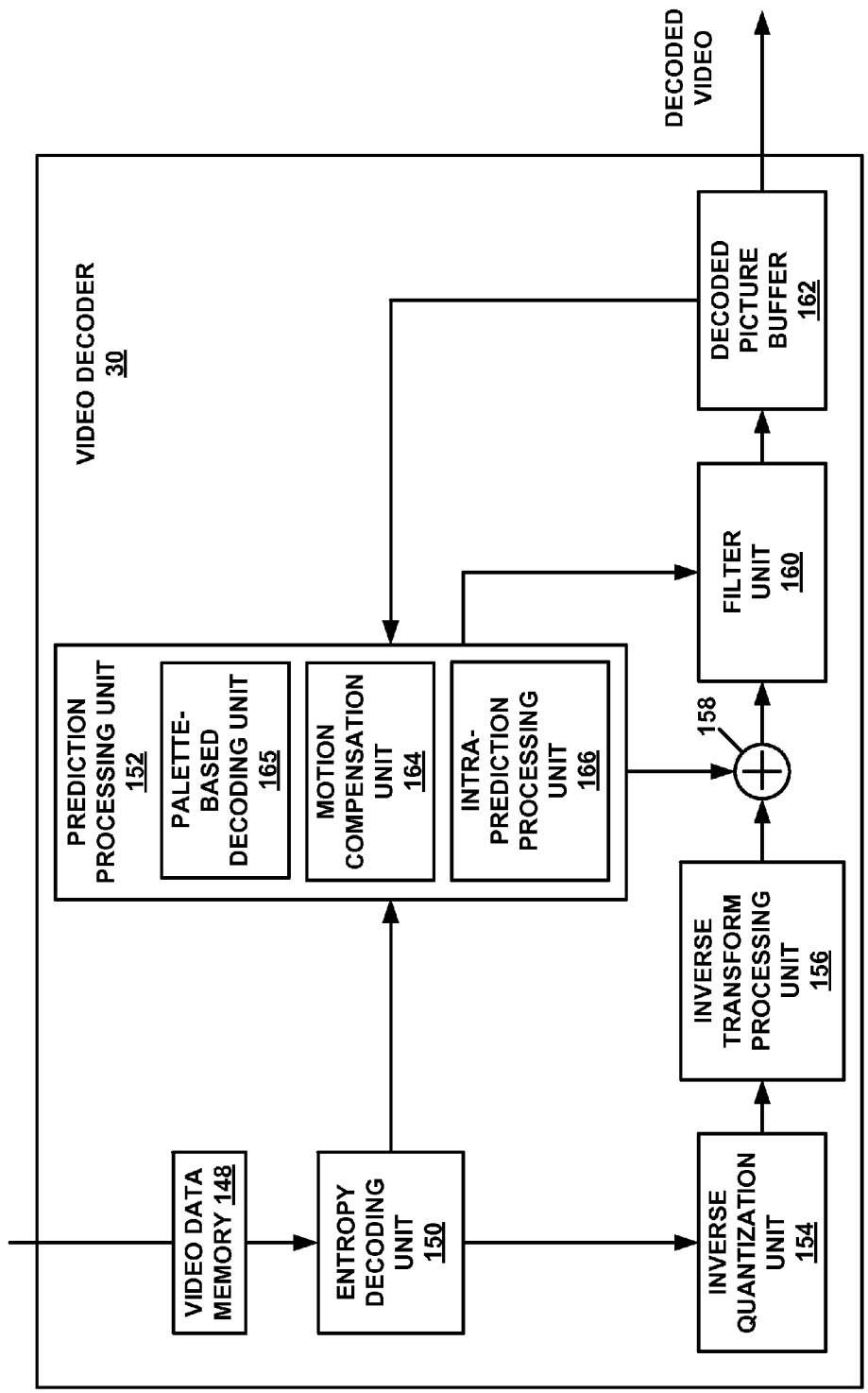
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding and generate palettes based on information associated with palette predictors, as signaled in an encoded bitstream, in accordance with various examples described in this disclosure. Video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Version 1. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder includes a video data memory 148, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure, including techniques for decoding information associated with palette predictors. In other examples, video decoder 30 may include more, fewer, or different functional components.

Video data memory 148 may store video data, such as an encoded video bitstream, to be decoded by the components of video decoder 30. The video data stored in video data memory 148 may be obtained, for example, from computer-readable medium 16, e.g., from a local video source, such as a camera, via wired or wireless network communication of video data, or by accessing physical data storage media. Video data memory 148 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 148 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and decoded picture buffer 162 may be provided by the same memory device or separate memory devices. In various examples, video data memory 148 may be on-chip with other components of video decoder 30, or off-chip relative to those components.

Video data memory 148, i.e., a CPB, may receive and store encoded video data (e.g., NAL units) of a bitstream. Entropy decoding unit 150 may receive encoded video data (e.g., NAL units) from video data memory 148 and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some positions of a block of video data with entries in the palette, select pixel values in the palette based on the information, and reconstruct pixel values of the block based on the selected pixel values. Also, palette-based decoding unit 165 may be configured to decode information from the encoded video data bitstream associated with palette predictors, and use such information to predict palettes for use in decoding video data. Although various functions are described as being performed by palette-based decoding unit 165, some or all of such functions may be performed by other processing units, or a combination of different processing units.

In accordance with the techniques of this disclosure, video decoder 30 may be configured to decode a block of video data that has a single color value using a single color mode as a sub-mode of a palette coding mode. In accordance with the disclosed techniques, upon receiving a syntax element in an encoded bitstream indicating that a block is to be decoded using the single color mode of the palette coding mode, palette-based decoding unit 165 generates a palette for the block including a single palette entry that indicates a single color value, and decodes the block with respect to the palette such that all pixels within the block have the single color value indicated in the palette.

In some examples, palette-based decoding unit 165 may generate the palette for the block based on receiving the single color value in the encoded bitstream as a non-predicted palette entry, and using the non-predicted palette entry as the single palette entry in the palette. In other examples, palette-based decoding unit 165 may generate the palette for the block based on selecting an entry in a palette predictor that indicates the single color value to be the single palette entry in the palette. In general, the palette predictor may include one or more palette entries from one or more palettes of previously decoded blocks.

In this way, a block having a single color value may be decoded using the single color mode of the palette coding mode with a reduced number of bits compared to a normal mode of the palette coding mode. For example, video decoder 30 may decode a current block using the single color mode of the palette coding mode without having to decode a binary palette prediction vector used to generate a palette, a number of non-predicted palette entries and their corresponding values to be included in the palette, a flag to indicate whether escape pixels having colors that are not included in the palette are present in the block, or any index values corresponding to palette entries that indicate color values for pixels within the block. The techniques for decoding a block of video data that has a single color value using a single color mode as a sub-mode of a palette coding mode are described in more detail with respect to FIG. 6.

Figure 4:
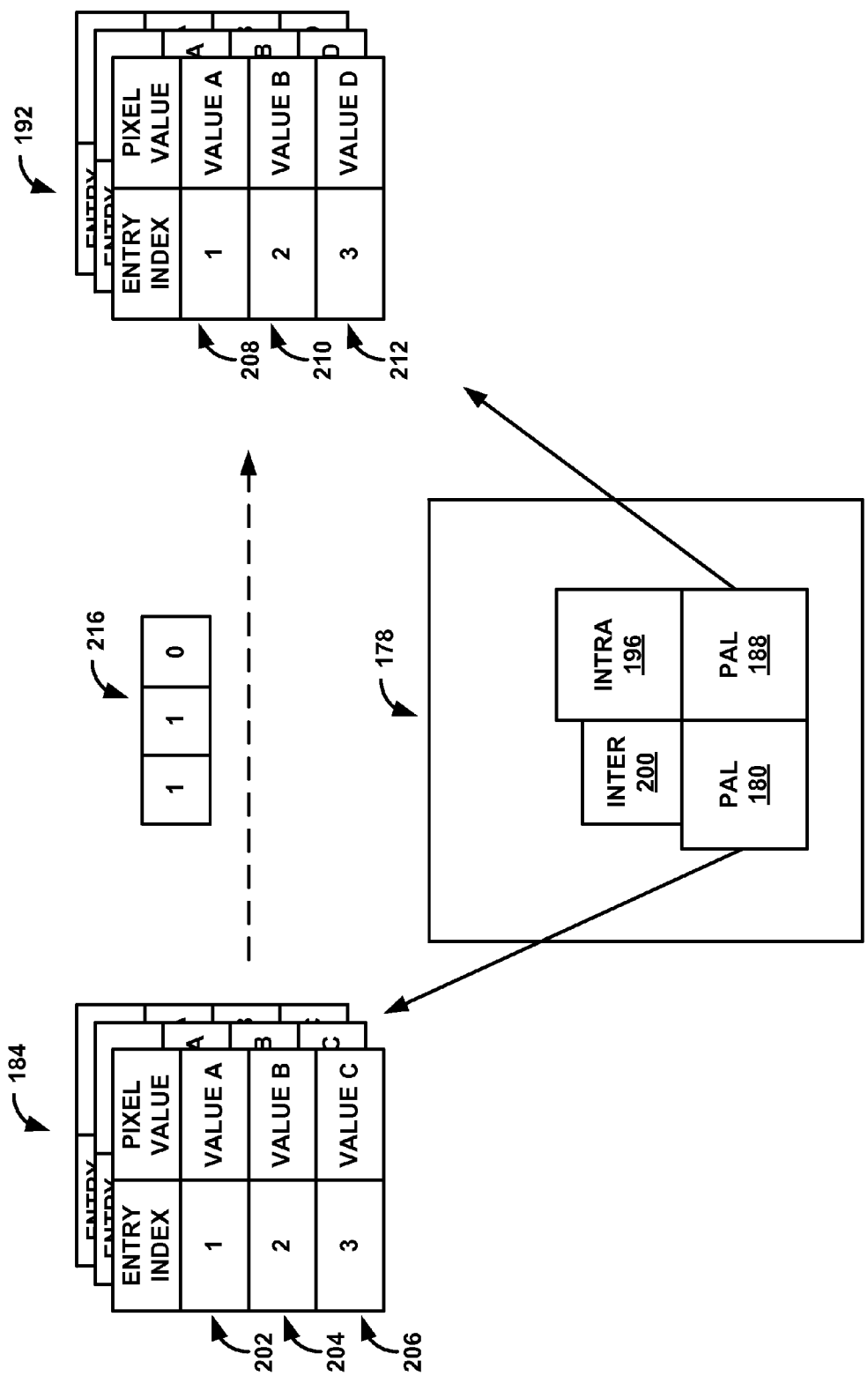
FIG. 4 is a conceptual diagram illustrating an example of determining palette entries for palette-based video coding, in accordance with the techniques described in this disclosure.

FIG. 4 is a conceptual diagram illustrating an example of determining palette entries for palette-based video coding, in accordance with the techniques described in this disclosure. The example of FIG. 4 includes a picture 178 having a first coding unit (CU) 180 that is coded with a palette coding mode with respect to first palettes 184 and a second CU 188 that is coded with the palette coding mode with respect to second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, i.e., CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a first chroma (U) component of the CU, and yet another palette for a second chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of first palettes 184 and second palettes 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the palette indices to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the palette indices 1-3. That is, for each pixel position of first CU 180, video encoder 20 may encode an index value for the pixel, where the index value is associated with a pixel value in one or more of first palettes 184. Video decoder 30 may obtain the palette indices from a bitstream and reconstruct the pixel values using the palette indices and one or more of first palettes 184.

In some examples, video encoder 20 and video decoder 30 may determine second palettes 192 based on first palettes 184. For example, video encoder 20 and/or video decoder 30 may locate one or more blocks from which the previous palettes, in this example, first palettes 184, are determined. The combination of entries being used for purposes of prediction may be referred to as a palette predictor.

In the example of FIG. 4, second palettes 192 include three entries 208-212 having entry index value 1, entry index value 2, and entry index value 3, respectively. Entries 208-212 relate the palette indices to pixel values including pixel value A, pixel value B, and pixel value D, respectively. In this example, video encoder 20 may code one or more syntax elements indicating which entries of first palettes 184 (representing a palette predictor, although the palette predictor may include entries of a number of blocks) are included in second palettes 192.

In the example of FIG. 4, the one or more syntax elements are illustrated as a vector 216. Vector 216 has a number of associated bins (or bits), with each bin indicating whether a corresponding entry in the palette predictor is used to predict an entry of the current palette. For example, vector 216 indicates that the first two entries (202 and 204) of first palettes 184 are included in the first two entries (208 and 210) of second palettes 192 (a value of "1" in vector 216), while the third entry 206 of first palettes 184 is not included in second palettes 192 (a value of "0" in vector 216). In this example, the pixel value D indicated by the third entry 212 of second palettes 192 may be explicitly signaled in an encoded bitstream. In the example of FIG. 4, the vector is a Boolean vector. The vector may be referred to as a binary palette prediction vector.

In some examples, as noted above, video encoder 20 and video decoder 30 may determine a palette predictor (which may also be referred to as a palette predictor table or palette predictor list) when performing palette prediction. The palette predictor may include one or more palette entries from one or more palettes of previously coded neighboring blocks that are used to predict one or more entries of a palette for coding a current block. Video encoder 20 and video decoder 30 may construct the palette predictor in the same manner. Video encoder 20 and video decoder 30 may code data (such as vector 216) to indicate which entries in the palette predictor are to be copied to a palette for coding a current block.

Thus, in some examples, palette entries for previously decoded CUs are stored in a palette predictor list. This list may be used to predict palette entries in a palette for a current CU. In some examples, the predicted palette entries for the current CU may be moved to a beginning of the palette predictor list because the predicted palette entries have a high probability of being used to predict palette entries in a palette for a subsequently coded neighboring CU. A binary palette prediction vector may be signaled in the bitstream to indicate which entries in the list are re-used in the current palette. In U.S. application Ser. No. 14/667, 411, filed Mar. 24, 2015, binary tree based signaling methods and end-position based signaling methods are used to code the binary palette prediction vector, and run length coding is used to compress the binary palette prediction vector. In an example, the run-length value is coded using $0^{th}$ order Exp-Golomb code. In U.S. Provisional Application No. 62/002,741, filed May 23, 2014, a group based signaling method is used to code the binary palette prediction vector.

According to aspects of this disclosure, video encoder 20 and video decoder 30 may be configured to code (e.g., encode and decode, respectively) a current CU that has a single color value using a single color mode as a sub-mode of a palette coding mode with respect to a palette that includes only a single palette entry indicating the single color value. Each of video encoder 20 and video decoder 30 may generate the palette for the current single color CU to include the single palette entry indicating the single color value. In some examples, the single color value indicated by the single palette entry of the palette for the current CU may be explicitly signaled in the encoded bitstream as a non-predicted palette entry, e.g., similar to pixel value D in the third entry 212 of second palettes 192. In other examples, the single color value indicated by the single palette entry of the palette for the current CU may be predicted from a palette predictor. Several specific examples of predicting the single palette entry in the palette for the current CU are described below.

In one example, an index value corresponding to an entry in the palette predictor that indicates the single color value may be signaled in the encoded bitstream and video decoder 30 may use the corresponding entry from the palette predictor as the single palette entry in the palette for the current CU. In another example, a maximum size of the palette predictor may be set equal to 1 such that the palette predictor only includes a first entry that indicates the single color value, e.g., first entry 202 of first palettes 184 representing the palette predictor. In this case, video decoder 30 may use the first and only entry from the palette predictor as the single palette entry in the palette for the current single color CU, without having to receive an index value of the first entry in the encoded bitstream.

In a further example, a maximum size of the palette predictor may be set equal to M, which is an integer value greater than 1, such that the palette predictor includes a first M entries, e.g., first entry 202 and second entry 204 of first palettes 184 representing the palette predictor in the case that M=2. In this case, an index value corresponding to one of the first M entries in the palette predictor that indicates the single color value may be signaled in the encoded bitstream, and video decoder 30 may use the corresponding one of the first M entries as the single palette entry in the palette for the current single color CU.

In another example, at least one entry is pruned or removed from the palette predictor based on a difference between the at least one entry and a value of neighboring pixels of the current CU being greater than a threshold, where the value of the neighboring pixels may be a mean value of the neighboring pixels, a median value of the neighboring pixels, or a color value of one of the neighboring pixels. In this case, an index value corresponding to one of one or more remaining entries in the palette predictor that indicates the single color value may be signaled in the encoded bitstream, and video decoder 30 may use the corresponding one of the remaining entries as the single palette entry in the palette for the current single color CU. In either of the previous two examples, the reduced size of the palette predictor, compared to the normal mode of the palette coding mode, may reduce a number of bits needed to signal an index value of the palette predictor.

In addition, unlike the normal mode of the palette coding mode, the predicted single palette entry in the palette for the current single color CU may not be moved to a first position of the palette predictor for use predicting palette entries for subsequently coded neighboring CUs. In this way, according to the techniques of this disclosure, implementation of the single coding mode of the palette coding mode is as simple as possible.

Figure 5:
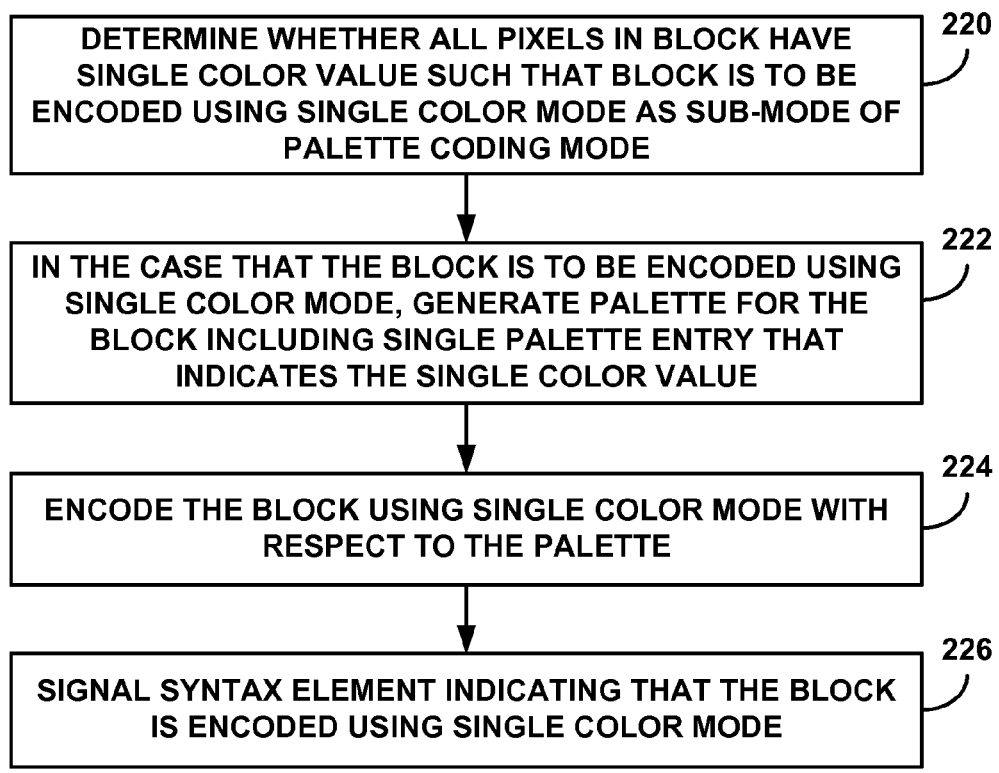
FIG. 5 is a flowchart illustrating an example operation of a video encoder encoding a block of video data using a single color mode as a sub-mode of the palette coding mode.

FIG. 5 is a flowchart illustrating an example operation of a video encoder encoding a block of video data using a single color mode as a sub-mode of the palette coding mode. The example operation illustrated in FIG. 5 may be performed by video encoder 20 from FIG. 2.

In accordance with the techniques described in this disclosure, video encoder 20 determines whether all pixels within a block of video data have a single color value such that the block is to be encoded using a single color mode as a sub-mode of a palette coding mode (220). In the case that the block is to be encoded using the single color mode of the palette coding mode, palette-based encoding unit 122 of video encoder 20 generates a palette for the current block including a single palette entry that indicates the single color value (222). Upon generating the palette for the current block, palette-based encoding unit 122 encodes the current block using the single color mode of the palette coding mode with respect to the palette (224).

For example, to encode the current block using the single color mode, palette-based encoding unit 122 may signal the single color value indicated by the single palette entry in the palette as a non-predicted palette entry. As another example, to encode the current block using the single color mode, palette-based encoding unit 122 may select an entry in a palette predictor used to predict the single palette entry in the palette that indicates the single color value. As described above with respect to FIG. 4, the palette predictor includes one or more palette entries from one or more palettes of previously encoded blocks that may be used to predict the single palette entry in the palette for the current block. Several specific examples of predicting the single palette entry are described below.

In one example, to encode the current block using the single color mode, palette-based encoding unit 122 may signal an index value corresponding to the selected entry in the palette predictor used to predict the single palette entry in the palette that indicates the single color value.

In another example, to encode the current block using the single color mode, palette-based encoding unit 122 may set a maximum size of the palette predictor to be equal to one such that the palette predictor only includes a first entry, the first entry being the selected entry used to predict the single palette entry in the palette that indicates the single color value. In this example, palette-based encoding unit 122 may use the first and only entry from the palette predictor to predict the single palette entry in the palette for the current block without having to signal an index value corresponding to the first entry in the palette predictor in the encoded bitstream.

In an additional example, to encode the current block using the single color mode, palette-based encoding unit 122 may set a maximum size of the palette predictor to be equal to M such that the palette predictor includes a first M entries, where M is an integer value greater than one. Palette-based encoding unit 122 may then signal an index value corresponding to one of the first M entries in the palette predictor, the one of the first M entries being the selected entry used to predict the single palette entry in the palette that indicates the single color value. In this example, the reduced size of the palette predictor, compared to the normal mode of the palette coding mode, may reduce a number of bits needed to signal the index value corresponding to the one of the first M entries in the palette predictor in the encoded bitstream.

In another example, to encode the current block using the single color mode, palette-based encoding unit 122 may prune or remove at least one entry from the palette predictor based on a difference between the at least one entry and a value of neighboring pixels of the current block being greater than a threshold. In some cases, the value of the neighboring pixels of the current block may be a mean value of color values in one or more of an above-neighboring line of reconstructed pixels or a left-neighboring line of reconstructed pixels. In other cases, the value of the neighboring pixels of the current block may be a median value of color values in one or more of an above-neighboring line of reconstructed pixels or a left-neighboring line of reconstructed pixels. In still other cases, the value of the neighboring pixels of the current block may be a color value of one of the reconstructed pixels in either an above-neighboring line of reconstructed pixels or a left-neighboring line of reconstructed pixels. Based on the difference between a given entry from the palette predictor and the value of the neighboring pixels of the current block being greater than a threshold, palette-based encoding unit 122 may prune or remove the given entry from the palette predictor.

Palette-based encoding unit 122 may perform the above described entry removal determination for each of the entries in the palette predictor such that the palette predictor includes one or more remaining entries. Palette-based encoder unit 122 may then signal an index value corresponding to one of the remaining entries in the palette predictor, the one of the remaining entries being the selected entry used to predict the single palette entry in the palette that indicates the single color value. In this example, the reduced size of the palette predictor, compared to the normal mode of the palette coding mode, may reduce a number of bits needed to signal the index value corresponding to the one of the remaining entries in the palette predictor in the encoded bitstream.

In addition, after encoding the current block using the single color mode of the palette coding mode with respect to the palette for the block including the single palette entry that is predicted from the selected entry in the palette predictor, palette-based encoding unit 122 may determine to not move the predicted single palette entry for the current block to a first position of the palette predictor for use predicting palette entries for subsequently encoded neighboring blocks. This is unlike the normal mode of the palette coding mode in which the predicted palette entries for a current block may be moved to a beginning of the palette predictor because the predicted palette entries have a high probability of being used to predict palette entries in a palette for a subsequent coded neighboring block. In this way, according to the techniques of this disclosure, implementation of the single coding mode of the palette coding mode is as simple as possible.

In further accordance with the techniques described in this disclosure, palette-based encoding unit 122 of video encoder 20 signals a syntax element indicating that the current block is encoded using the single color mode of the palette coding mode (226).

In some examples, video encoder 20 may signal the syntax element (e.g., a flag) in the encoded bitstream that indicates whether or not the current block of the video data is encoded using the single color mode of the palette coding mode. In the case that all of the pixels within the current block do not have the single color value such that the block is not to be encoded using the single color mode of the palette coding mode, video encoder 20 may signal another syntax element (e.g., a flag) in the encoded bitstream indicating whether or not the current block is encoded using a normal mode of the palette coding mode. In this example, both the single color mode and the normal mode may be sub-modes of the palette coding mode.

In other examples, video encoder 20 may signal a first syntax element (e.g., a flag) in the encoded bitstream that indicates whether or not the current block of the video data is encoded using the palette coding mode, and, in the case that the current block is encoded using the palette coding mode, signal a second syntax element (e.g., a flag) in the encoded bitstream that indicates whether or not the current block is encoded using the single color mode of the palette coding mode.

In some cases, video encoder 20 may signal the syntax element indicating whether the current block is encoded using the single color mode of the palette coding mode after signaling a skip flag indicating that the current block is not encoded using a skip mode, and prior to signaling a prediction mode flag, where the prediction mode flag indicates whether the current block is encoded using an inter-prediction mode or an intra-prediction mode in the case that the block is not encoded using the palette coding mode. In other cases, video encoder 20 may signal the syntax element after signaling the prediction mode flag indicating that the current block is encoded using an intra-prediction mode.

Figure 6:
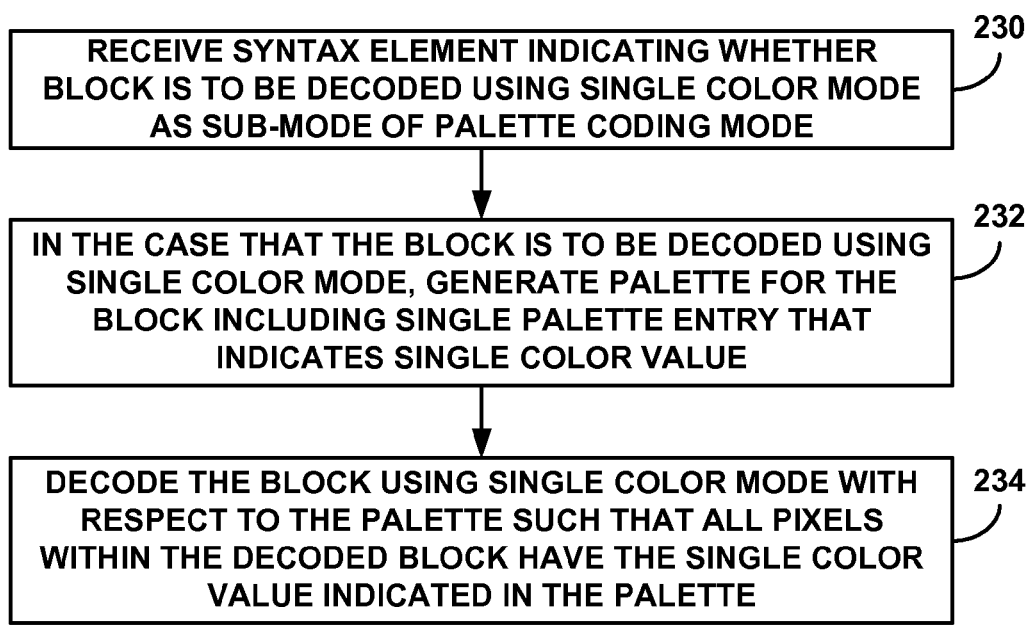
FIG. 6 is a flowchart illustrating an example operation of a video decoder decoding a block of video data using a single color mode as a sub-mode of the palette coding mode.

FIG. 6 is a flowchart illustrating an example operation of a video decoder decoding a block of video data using a single color mode as a sub-mode of the palette coding mode. The example operation illustrated in FIG. 6 may be performed by video decoder 30 from FIG. 3.

Video decoder 30 receives an encoded bitstream from a video encoder, such as video encoder 20. The encoded bitstream includes representations of encoded blocks of video data for at least one picture and one or more syntax elements associated with the video data. In accordance with the techniques described in this disclosure, video decoder 30 may receive a syntax element indicating whether a block of video data is to be decoded using a single color mode as a sub-mode of a palette coding mode (230).

In some examples, video decoder 30 may receive the syntax element (e.g., a flag) in the bitstream that indicates whether or not the current block of the video data is to be decoded using the single color mode of the palette coding mode, and, in the case that the current block is not to be decoded using the single color mode, receive another syntax element (e.g., a flag) in the bitstream indicating whether or not the current block is to be decoded using a normal mode of the palette coding mode. In this example, both the single color mode and the normal mode may be sub-modes of the palette coding mode.

In other examples, video decoder 30 may receive a first syntax element (e.g., a flag) in the bitstream that indicates whether or not the current block of the video data is to be decoded using the palette coding mode, and, in the case that the current block is to be decoding using the palette coding mode, receive a second syntax element (e.g., a flag) in the bitstream that indicates whether or not the current block is to be decoded using the single color mode of the palette coding mode.

In some cases, video decoder 30 may receive the syntax element indicating whether the current block is to be decoded using the single color mode of the palette coding mode after receiving a skip flag indicating that the current block is not to be decoded using a skip mode, and prior to receiving a prediction mode flag, where the prediction mode flag indicates whether the current block is to be decoded using an inter-prediction mode or an intra-prediction mode in the case that the block is not to be decoded using the palette coding mode. In other cases, video decoder 30 may receive the syntax element after receiving the prediction mode flag indicating that the current block is to be decoded using an intra-prediction mode.

In the case that the current block is to be decoded using the single color mode of the palette coding mode, palette-based decoding unit 165 of video decoder 30 generates a palette for the current block including a single palette entry that indicates a single color value (232). Upon generating the palette for the current block, palette-based decoding unit 165 decodes the block using the single color mode of the palette coding mode with respect to the palette such that all pixels within the decoded block have the single color value indicated in the palette for the block (234).

For example, to generate the palette for the current block, palette-based decoding unit 165 may receive the single color value as a non-predicted palette entry, and use the non-predicted palette entry as the single palette entry in the palette for the current block. As another example, to generate the palette for the current block, palette-based decoding unit 165 may select an entry from a palette predictor that indicates the single color value to be the single palette entry in the palette for the current block. As described above with respect to FIG. 4, the palette predictor includes one or more palette entries from one or more palettes of previously decoded blocks that may be used to predict the single palette entry in the palette for the current block. Several specific examples of predicting the single palette entry are described below.

In one example, to generate the palette for the current block, palette-based decoding unit 165 may receive an index value corresponding to the entry in the palette predictor that indicates the single color value, and select the corresponding entry from the palette predictor to be the single palette entry in the palette for the block.

In another example, to generate the palette for the current block, palette-based decoding unit 165 may set a maximum size of the palette predictor to be equal to one such that the palette predictor only includes a first entry, the first entry being the entry that indicates the single color value, and select the first entry from the palette predictor to be the single palette entry in the palette for the block. In this example, palette-based decoding unit 165 may use the first and only entry from the palette predictor as the single palette entry in the palette for the current block without having to receive an index value corresponding to the first entry in the palette predictor from the encoded bitstream.

In an additional example, to generate the palette for the current block, palette-based decoding unit 165 may set a maximum size of the palette predictor to be equal to M such that the palette predictor includes a first M entries, where M is an integer value greater than one. Palette-based decoding unit 165 may then receive an index value corresponding to one of the first M entries in the palette predictor, the one of the first M entries being the entry that indicates the single color value, and select the corresponding one of the first M entries from the palette predictor to be the single palette entry in the palette for the block. In this example, the reduced size of the palette predictor, compared to the normal mode of the palette coding mode, may reduce a number of bits needed to signal the index value corresponding to the one of the first M entries in the palette predictor in the encoded bitstream.

In another example, to generate the palette for the current block, palette-based decoding unit 165 may prune or remove at least one entry from the palette predictor based on a difference between the at least one entry and a value of neighboring pixels of the current block being greater than a threshold. In some cases, the value of the neighboring pixels of the current block may be a mean value of color values in one or more of an above-neighboring line of reconstructed pixels or a left-neighboring line of reconstructed pixels. In other cases, the value of the neighboring pixels of the current block may be a median value of color values in one or more of an above-neighboring line of reconstructed pixels or a left-neighboring line of reconstructed pixels. In still other cases, the value of the neighboring pixels of the current block may be a color value of one of the reconstructed pixels in either an above-neighboring line of reconstructed pixels or a left-neighboring line of reconstructed pixels. Based on the difference between a given entry from the palette predictor and the value of the neighboring pixels of the current block being greater than a threshold, palette-based decoding unit 165 may prune or remove the given entry from the palette predictor.

Palette-based decoding unit 165 may perform the above described entry removal determination for each of the entries in the palette predictor such that the palette predictor includes one or more remaining entries. Palette-based decoder unit 165 may then receive an index value corresponding to one of the remaining entries in the palette predictor, the one of the remaining entries being the entry that indicates the single color value, and select the corresponding one of the remaining entries from the palette predictor to be the single palette entry in the palette for the block. In this example, the reduced size of the palette predictor, compared to the normal mode of the palette coding mode, may reduce a number of bits needed to signal the index value corresponding to the one of the remaining entries in the palette predictor in the encoded bitstream.

In addition, in the single color mode of the palette coding mode, after generating the palette for the current block including the single palette entry that is predicted from the palette predictor, palette-based decoding unit 165 may determine to not move the predicted single palette entry for the current block to a first position of the palette predictor for use predicting palette entries for subsequently decoded neighboring blocks. This is unlike the normal mode of the palette coding mode in which the predicted palette entries for a current block may be moved to a beginning of the palette predictor because the predicted palette entries have a high probability of being used to predict palette entries in a palette for a subsequently coded neighboring block. In this way, according to the techniques of this disclosure, implementation of the single coding mode of the palette coding mode is as simple as possible.

In this disclosure, techniques described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

As described in this disclosure, video encoder 20 and/or video decoder 30 may be configured to predict or code with the palette mode, and code a palette prediction vector using various techniques described in this disclosure, alone or in any combination. In some examples, such techniques for coding a palette prediction vector may promote coding efficiency. While the techniques described in this disclosure are described in the context of CUs (HEVC), it should be understood that the techniques may also be applied to prediction units (PUs) or in other video coding processes and/or standards.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless communication device, a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a syntax element indicating that a block of video data is to be decoded using a single color mode as a sub-mode of a palette coding mode, wherein the single color mode is only used to code a given block in which all pixels within the given block have a same color value;
   in response to the indication that the block is to be decoded using the single color mode of the palette coding mode, generating a palette for the block based on a palette predictor, wherein the palette includes a single palette entry that indicates a single color value of the block, wherein generating the palette for the block comprises:
      setting a maximum size of the palette predictor to be equal to one,
      generating the palette predictor to only include a first entry in accordance with the maximum size of the palette predictor, and
      predicting the single palette entry in the palette for the block from the first entry in the palette predictor; and
   decoding the block using the single color mode of the palette coding mode with respect to the palette, wherein decoding the block using the single color mode of the palette coding mode includes setting all pixels within the decoded block equal to the single color value indicated by the single palette entry in the palette for the block without decoding any index values corresponding to the single palette entry in the palette for the pixels within the block.

2. The method of claim 1, further comprising, after generating the palette for the block including the single palette entry predicted from the first entry in the palette predictor, determining to not move the predicted single palette entry to the first entry in the palette predictor for use predicting palette entries for subsequently decoded blocks.

3. The method of claim 1, wherein the block of video data comprises a first block of video, and wherein the palette for the block comprises a first palette for the first block, the method further comprising:
   receiving the syntax element indicating that a second block of video data is not to be decoded using the single color mode of the palette coding mode;
   in response to the indication that the second block is not to be decoded using the single color mode of the palette coding mode, receiving another syntax element indicating that the second block is to be decoded using a normal mode of the palette coding mode, the single color mode and the normal mode being sub-modes of the palette coding mode;
   generating a second palette for the second block including two or more palette entries that each indicates a different color value; and
   decoding index values for pixels within the second block using the normal mode of the palette coding mode with respect to the second palette, wherein each of the index values corresponds to one of the two or more palette entries in the second palette that indicates the color value for the respective one of the pixels within the second block.

4. The method of claim 1,
   wherein receiving the syntax element indicating that the block is to be decoded using the single color mode of the palette coding mode comprises receiving the syntax element after receiving a skip flag indicating that the block is not to be decoded using a skip mode, and
   wherein, in response to the indication that the block is to be decoded using the single color mode of the palette coding mode, not receiving a prediction mode flag, wherein the prediction mode flag is used to indicate one of an inter-prediction mode or an intra-prediction mode for a block of video data that is not to be decoded using the palette coding mode.

5. A method of encoding video data, the method comprising:
   determining that all pixels within a block of video data are equal to a single color value such that the block is to be encoded using a single color mode as a sub-mode of a palette coding mode, wherein the single color mode is only used to code a given block in which all pixels within the given block have a same color value;
   in response to the determination that the block is to be encoded using the single color mode of the palette coding mode, generating a palette for the block based on a palette predictor, wherein the palette includes a single palette entry that indicates the single color value of the block, wherein generating the palette for the block comprises:

setting a maximum size of the palette predictor to be equal to one, generating the palette predictor to only include a first entry in accordance with the maximum size of the palette predictor, and predicting the single palette entry in the palette for the block from the first entry in the palette predictor;

encoding the block using the single color mode of the palette coding mode with respect to the palette, wherein encoding the block using the single color mode of the palette coding mode includes not encoding any index values corresponding to the single palette entry in the palette for the pixels within the block; and signaling a syntax element indicating that the block is encoded using the single color mode as the sub-mode of the palette coding mode.

6. The method of claim 5, further comprising, after encoding the block using the single color mode of the palette coding mode with respect to the palette for the block including the single palette entry predicted from the first entry in the palette predictor, determining to not move the predicted single palette entry to the first entry in the palette predictor for use predicting palette entries for subsequently encoded blocks.

7. The method of claim 5, wherein the block of video data comprises a first block of video, and wherein the palette for the block comprises a first palette for the first block, the method further comprising:

determining that all pixels within a second block of video data do not have a single color value such that the second block is not to be encoded using the single color mode of the palette coding mode;

in response to the determination that the second block is not to be encoded using the single color mode of the palette coding mode, signaling another syntax element indicating that the second block is encoded using a normal mode of the palette coding mode, the single color mode and the normal mode being sub-modes of the palette coding mode;

generating a second palette for the second block including two or more palette entries that indicate different color values; and encoding index values for the pixels within the second block using the normal mode of the palette coding mode with respect to the second palette, wherein each of the index values corresponds to one of the two or more palette entries in the second palette that indicates the color value for the respective one of the pixels within the second block.

8. The method of claim 5, wherein signaling the syntax element indicating that the block is encoded using the single color mode of the palette coding mode comprises signaling the syntax element after signaling a skip flag indicating that the block is not encoded using a skip mode, and wherein, in response to the determination that the block is to be encoded using the single color mode of the palette coding mode, not signaling a prediction mode flag, wherein the prediction mode flag is used to indicate one of an inter-prediction mode or an intra-prediction mode for a block of video data that is not encoded using the palette coding mode.

9. A video decoding device comprising:

a memory configured to store video data; and one or more processors in communication with the memory and configured to:

receive a syntax element indicating that a block of video data is to be decoded using a single color mode as a sub-mode of a palette coding mode, wherein the single color mode is only used to code a given block in which all pixels within the given block have a same color value;

in response to the indication that the block is to be decoded using the single color mode of the palette coding mode, generate a palette for the block based on a palette predictor, wherein the palette includes a single palette entry that indicates a single color value of the block, wherein, to generate the palette for the block, the one or more processors are configured to:

set a maximum size of the palette predictor to be equal to one, generate the palette predictor to only include a first entry in accordance with the maximum size of the palette predictor, and predict the single palette entry in the palette for the block from the first entry in the palette predictor; and decode the block using the single color mode of the palette coding mode with respect to the palette, wherein, to decode the block using the single color mode of the palette coding mode, the one or more processors are configured to set all pixels within the decoded block equal to the single color value indicated by the single palette entry in the palette for the block without decoding any index values corresponding to the single palette entry in the palette for the pixels within the block.

10. The video decoding device of claim 9, wherein the one or more processors are configured to, after generating the palette for the block including the single palette entry predicted from the first entry in the palette predictor, determine to not move the predicted single palette entry to the first entry in the palette predictor for use predicting palette entries for subsequently decoded blocks.

11. The video decoding device of claim 9, wherein the video decoding device comprises at least one of:

an integrated circuit;

a microprocessor; or a wireless communication device.

12. A video encoding device comprising:

a memory configured to store video data; and one or more processors in communication with the memory and configured to:

determine that all pixels within a block of video data are equal to a single color value such that the block is to be encoded using a single color mode as a sub-mode of a palette coding mode, wherein the single color mode is only used to code a given block in which all pixels within the given block have a same color value;

in response to the determination that the block is to be encoded using the single color mode of the palette coding mode, generate a palette for the block based on a palette predictor, wherein the palette includes a single palette entry that indicates the single color value of the block, wherein, to generate the palette for the block, the one or more processors are configured to:

set a maximum size of a palette predictor to be equal to one, generate the palette predictor to only include a first entry in accordance with the maximum size of the palette predictor, and predict the single palette entry in the palette for the block from the first entry in the palette predictor;

encode the block using the single color mode of the palette coding mode with respect to the palette, wherein, to encode the block using the single color mode of the palette coding mode, the one or more processor are configured to not encode any index values corresponding to the single palette entry in the palette for the pixels within the block; and signal a syntax element indicating that the block is encoded using the single color mode as the sub-mode of the palette coding mode.

13. The video decoding device of claim 9, wherein the block of video data comprises a first block of video, wherein the palette for the block comprises a first palette for the first block, and wherein the one or more processors are configured to:

receive the syntax element indicating that a second block of video data is not to be decoded using the single color mode of the palette coding mode;

in response to the indication that the second block is not to be decoded using the single color mode of the palette coding mode, receive another syntax element indicating that the second block is to be decoded using a normal mode of the palette coding mode, the single color mode and the normal mode being sub-modes of the palette coding mode;

generate a second palette for the second block including two or more palette entries that each indicates a different color value; and decode index values for pixels within the second block using the normal mode of the palette coding mode with respect to the second palette, wherein each of the index values corresponds to one of the two or more palette entries in the second palette that indicates the color value for the respective one of the pixels within the second block.

14. The video encoding device of claim 13, wherein the block of video data comprises a first block of video, wherein the palette for the block comprises a first palette for the first block, and wherein the one or more processors are configured to:

determine that all pixels within a second block of video data do not have a single color value such that the second block is not to be encoded using the single color mode of the palette coding mode;

in response to the determination that the second block is not to be encoded using the single color mode of the palette coding mode, signal another syntax element indicating that the second block is encoded using a normal mode of the palette coding mode, the single color mode and the normal mode being sub-modes of the palette coding mode;

generate a second palette for the second block including two or more palette entries that indicate different color values; and encode index values for the pixels within the second block using the normal mode of the palette coding mode with respect to the second palette, wherein each of the index values corresponds to one of the two or more palette entries in the second palette that indicates the color value for the respective one of the pixels within the second block.

* * * * *